April 9, 1968  R. T. CORNELIUS  3,376,998
MOLDED PLASTIC BOTTLE-CARRIER
Filed Dec. 28, 1964  3 Sheets-Sheet 1
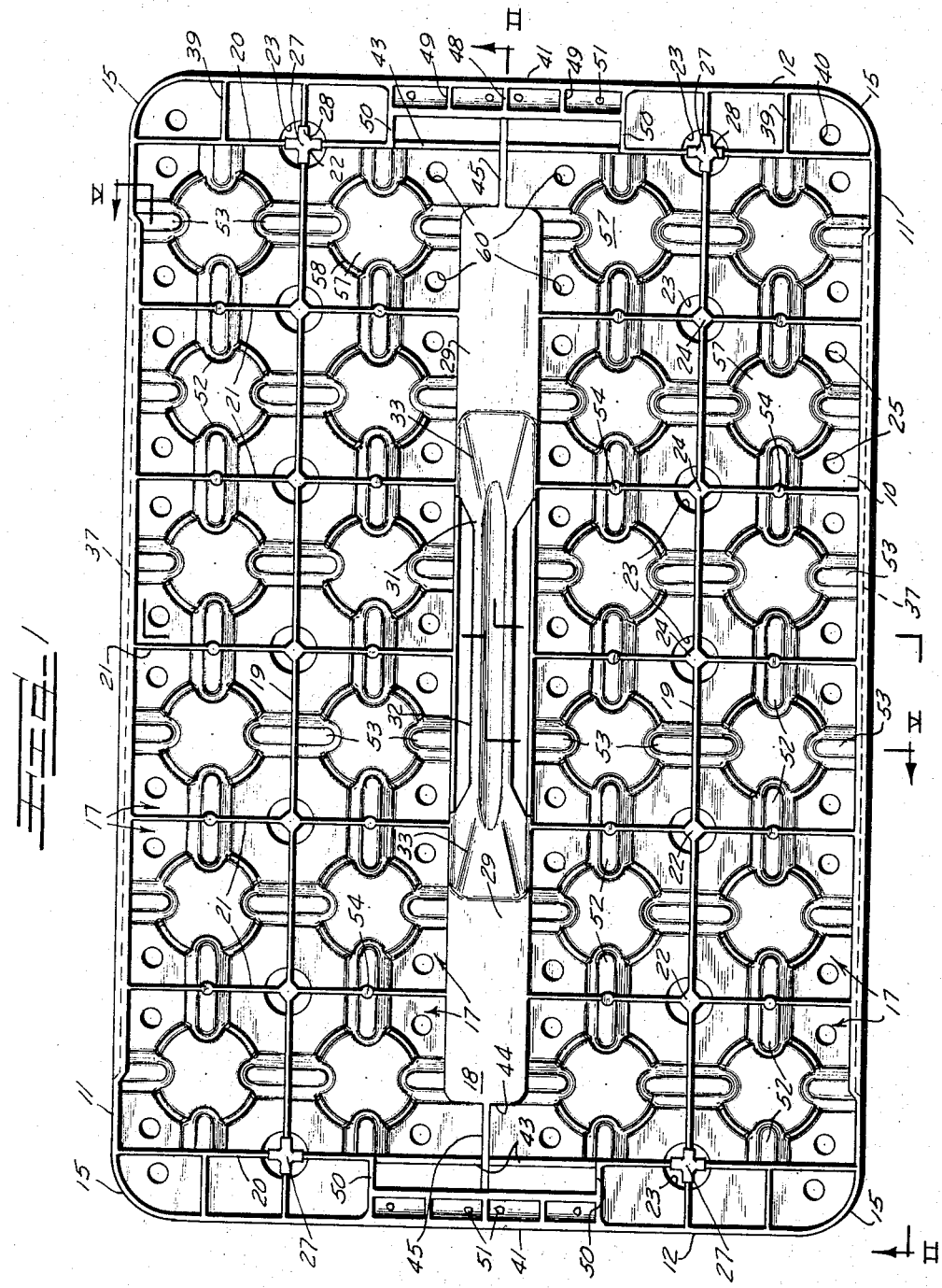
INVENTOR.
RICHARD T. CORNELIUS
BY Hill, Sherman, Meroni, Gross & Simpson
ATTORNEYS

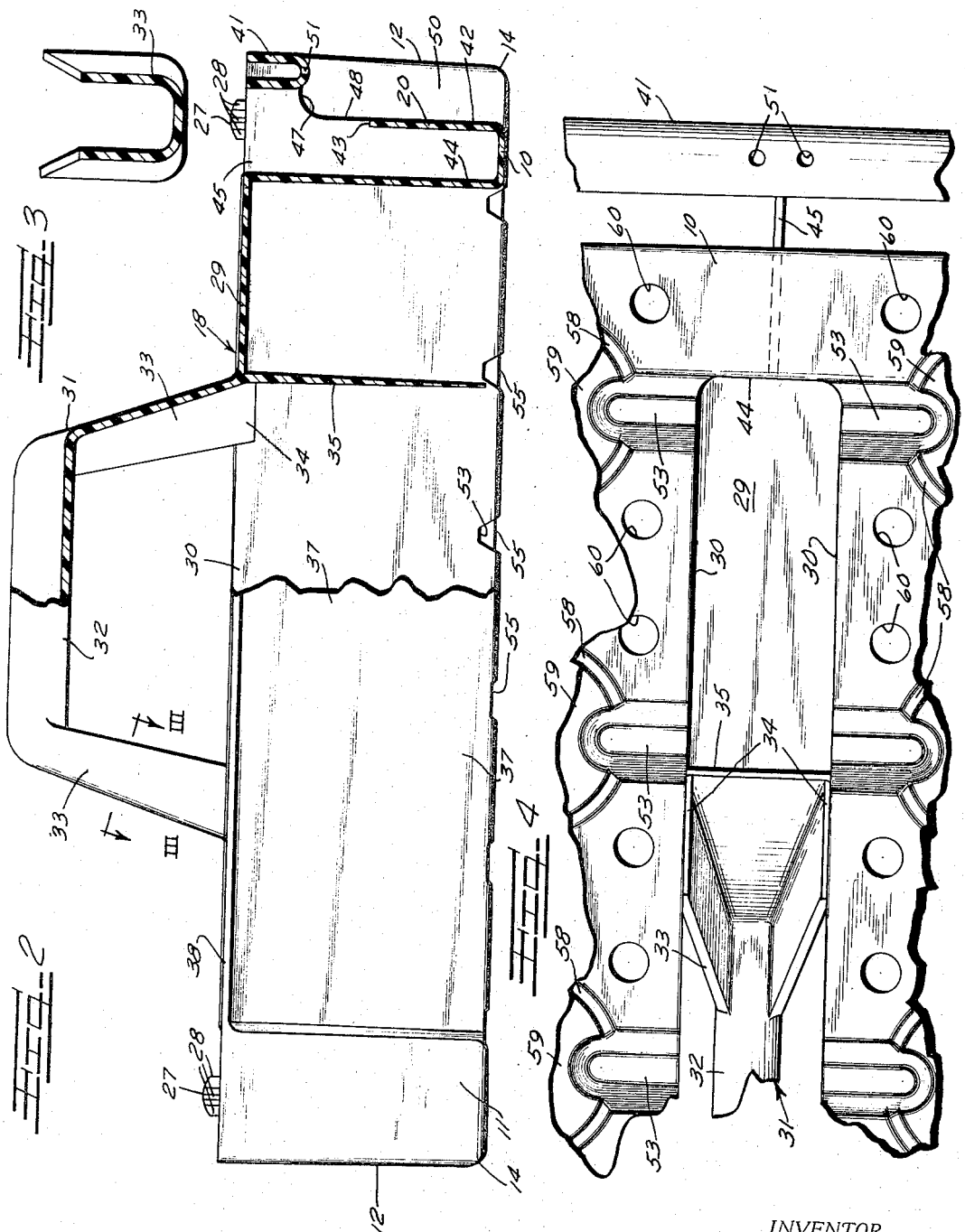

April 9, 1968  R. T. CORNELIUS  3,376,998
MOLDED PLASTIC BOTTLE-CARRIER
Filed Dec. 28, 1964  3 Sheets-Sheet 3
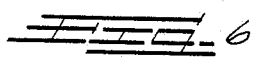
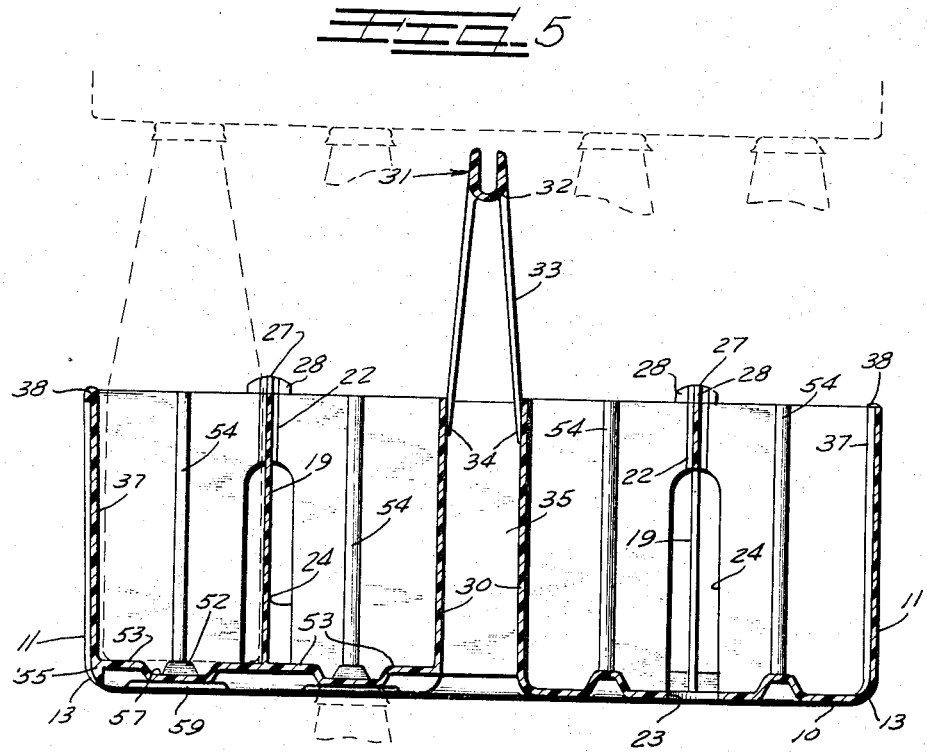
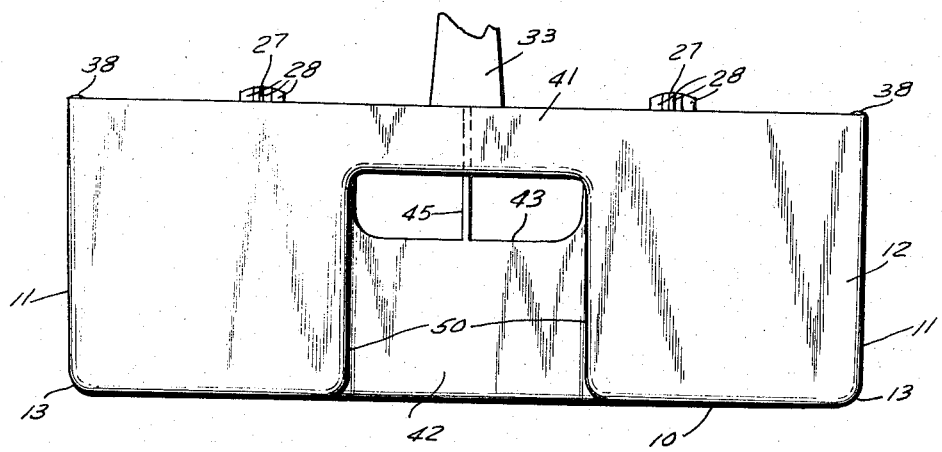
INVENTOR.
RICHARD T. CORNELIUS
BY
ATTORNEYS United States Patent Office 3,376,998
Patented Apr. 9, 1968

3,376,998
MOLDED PLASTIC BOTTLE-CARRIER
Richard T. Cornelius, Minneapolis, Minn., assignor to The Cornelius Company, Anoka, Minn., a corporation of Minnesota
Filed Dec. 28, 1964, Ser. No. 421,342
17 Claims. (Cl. 220—102)

ABSTRACT OF THE DISCLOSURE

A one-piece molded plastic 24-bottle carrier, interchangeable with conventional wooden carriers, has a center carrying handle on a hollow longitudinal cell divider and manipulating handlebars on opposite end buffer walls.

---

This invention relates to improvements in bottle carriers or cases of the type especially adapted for handling, transportation and storage of crown-capped beverage bottles, and is more particularly concerned with such carriers molded from suitable plastic such as high density polyethylene in a unitary, one-piece structure.

Heretofore, bottle-carrying cases have conventionally been made at least largely from wood. Therefore, bottling carrier-washing, and handling equipment in beverage bottling works, supporting racks in transportation conveyances such as delivery trucks, and the like, are generally designed and proportioned to accommodate such wooden carrying cases.

Many advantages are inherent in constructing these carriers or cases from moldable synthetic plastic material such as high density polyethylene. Among such advantages may be mentioned lighter weight as compared with wood in the same size of carrier, lack of water absorption, easy cleaning, great durability, and much latitude and adaptability in shaping and configuration.

Prior attempts to produce carrying cases from molded plastic have run into excessive production costs due, at least in part, to the need in the prior constructions of numerous die parts including slides and the like, and slow production of relatively complex molded configurations.

An important object of the present invention is to provide a new and improved bottle carrier or case structure adapted to be made entirely as a one-piece molded plastic unit, utilizing minimum material and especially devised for high speed, economical production between a pair of mating separable forming dies, entirely eliminating any need for slides or other auxiliary die parts in forming any structural feature of the carrier.

Another object of the invention is to provide a lightweight, substantially thin shell section unitary molded plastic bottle-carrier construction in which although the shell wall sections are uniformly much thinner than the wall sections of a comparable wooden carrier, both inside and outside dimensions are substantially the same as the wooden carrier whereby the plastic carriers of this invention are interchangeable with wooden carriers of the same capacity. Thereby, the present molded plastic carrier is adapted for mixed or at random use in conjunction with wooden carriers in the bottling works, in loaded storage and display stacks and in transportation equipment.

A further object of the invention is to provide a new and improved molded plastic carrier which has a novel unusually rugged, reinforced construction although of an essentially thin-walled shell structure.

Still another object of the invention is to provide a new and improved molded plastic bottle-carrier having novel carrying handle structure.

Yet another object of the invention is to provide a new and improved molded plastic bottle-carrier having novel end handle structures.

A yet further object of the invention is to provide a new and improved unitary molded plastic bottle-carrier having novel stacking orientation means.

A yet further object of the invention is to provide a new and improved one-piece molded plastic carrier having a thin shell bottom structure of novel reinforced construction and simulative in over-all height to the thickness of the wooden bottom of conventional wooden carrying cases.

It is also an object of the invention to provide a new and improved thin shell essentially rigid molded plastic bottle-carrier having novel structure affording length and width compensation enabling mixed, at random interchangeable use with wooden carriers.

Other objects, features and advantages of the present invention will be readily apparent from the following detailed description of a preferred embodiment thereof, taken in conjunction with the accompanying drawings, in which:

FIGURE 1 is a top plan view of a bottle carrier or case embodying features of the invention;

FIGURE 2 is a side elevational and partially longitudinal sectional detail view taken substantially on the irregular line II—II of FIGURE 1;

FIGURE 3 is a sectional detail view taken substantially on the line III—III of FIGURE 2;

FIGURE 4 is a fragmentary enlarged bottom plan view of the carrying case;

FIGURE 5 is a transverse sectional detail view taken substantially on the irregular line V—V of FIGURE 1; and FIGURE 6 is an end elevational view of the carrier.

In the embodiment of the invention selected for illustration, a carrier or case is provided for handling twenty-four crown-capped bottles of the six and one-half to ten-ounce variety. Such a carrier is especially suitable for commercial sales of bottled beverages such as to the vending machine trade, bars, soft drink stands, and like large scale retailers. More particularly, the illustrated carrier is usable at random with the same capacity conventional wooden carrying cases of generally elongated, rectangular construction accommodating four parallel longitudinal coextensive rows of six bottles each.

Every feature of the exemplary embodiment of the plastic tray lends itself to one-shot molding in a die set consisting of but two opposed complementary die members free from any need for slides or inserts insofar as structural features are concerned. All surfaces which face generally toward the ends or the sides of the carrier structure are fully oriented for shaping by corresponding die surfaces of either the upper or the bottom forming die section of the pair of forming dies, and with ample though minimum draft for ready separation of the rigidified molded carrier from the dies. All wall areas of the carrier lend themselves to essentially minimum shell wall section thickness throughout the structure, Plastic material on the order of high density polyethylene is contemplated in the molded, substantially rigid, self-sustaining structure, and that is intended to be the connotation of the term "plastic" as used herein.

On reference to FIGURE 1, the carrier includes a bottom wall structure 10, opposite spaced similar longitudinal side walls 11, and similar opposite end walls 12. Integral, one-piece juncture of the base wall structure 10 with the side walls 11 is on respective radius juncture ribs 13 (FIGS. 5 and 6). Reinforcing juncture of the end walls 12 with the base wall structure 10 is on rounded respective junctures 14 (FIG. 2). Integral juncture of the respective adjacent ends of the side walls 11 with the end walls 12 is on upright corner ribs 15 of substantial radius.

Within the tray-like receptacle area defined by the upright side and end walls 11 and 12 are means defining a plurality, and in this instance twenty-four, upwardly opening individual bottle-receiving cells 17. Such means comprise a longitudinal central integral divider 18, respective longitudinal intermediate integral divider partitions 19 between the central divider 18 and the side walls 11, respective transverse integral end partitions 20 adjacent to the end walls 12 and between the end partitions five transverse divider partitions 21.

All of the dividers 18, 19, 20 and 21 extend upwardly integrally from the base or bottom wall 10 and thus divide the bottom wall into individual cell areas, quadrangularly reinforced by the dividers which, in turn, are strongly mutually reinforced by integral interconnection to one another and to the side and end walls of the carrier. Further, all of the dividers are desirably in a substantially common elevational or height plane with the side and end walls 11 and 12 which are also in substantially a common height plane.

At the unitary integral crossing junctures of the longitudinal divider partitions 19 with the transverse divider partitions 20 and 21, respective vertical reinforcing symmetrical juncture bars 22 are provided which are of substantially greater cross-section than the thickness section of the partitions, such as on the order of 3 to 1. This substantially reinforces the partitions particularly in any tendency toward buckling under vertical loads such as may be imposed in stacking of the carriers in loaded or unloaded condition. Such reinforcement by the vertical bars 22 enables provision of substantial drainage clearance openings 23 in the bottom wall 10 aligned with the juncture bars 22 and having substantial upward extensions 24 in the aligned portions of the crossing partitions as best seen in FIGURE 5. This greatly facilitates washing of the carriers since each of the cells 17 has two of the vertically elongated drainage clearance openings 23, 24 communicating therewith as best visualized in FIGURE 1. Drainage from the respective cells 17 is further enhanced by additional drainage holes 25 through the bottom wall 10 adjacent to the respective inside corners opposite to the openings 23.

To facilitate stacking registration of empty carriers on one another, certain of the reinforcing bars 22 are provided with an upwardly projecting registration boss or lug extension 27 of limited height and adapted to extend into registering relation within the aligned holes 23 of a stacked carrier bottom. Thickened radial reinforcing and alignment vanes 28 integral with the subjacent partitions extend from the respective lugs 27 to a diameter slightly less than the diameter of the walls defining the registration openings 23. Desirably four of the rod extension lugs 27 are provided, one being located at each of the crossings of the longitudinal dividers 19 with the transverse end dividers 20 in a symmetrical relationship. This affords one of the lugs 27 adjacent to each of the corners 15 of the carrier. By having a plurality of the stacking alignment lugs or bosses 27 any one or more of them may be damaged or broken off due to rough handling but the remaining of such lugs will serve to align the stacked containers.

In addition to its divider function, the longitudinal central partition 18 serves as a dimensional compensator with respect to substantially equalizing orientation of the bottle-receiving pockets or cells 17 with those across the width of a conventional wooden carrier, and also serves as a carrying handle clearance area. To this end, throughout most of its length the divider 18 is of substantial width and is hollow, opening downwardly through the base wall 10. Across at least part of its upper edge the hollow divider 18 is closed by a top wall 29 on longitudinal vertical spaced divider side walls 30 integral with the bottom wall 10. The top wall 29 is in a common plane with the tops of the adjoining transverse partition dividers 21 which are integrally joined to the side walls 30.

In balanced relation over the center of the carrier, the hollow center divider 18 is provided with an integral upwardly extending handle 31 of generally inverted U-shape in side elevation. This handle includes a horizontal longitudinal hand grip or handle bar 32 supported at a suitable elevation by end riser struts or legs 33. While the hand grip bar 32 is preferably of upwardly opening generally U-shape cross-section as best seen in FIGURE 5, the handle legs are of generally downwardly and inwardly opening U-shaped cross-section as best seen in FIGURES 3 and 4. For reinforced juncture with the side walls 30, the side flanges of the connecting legs 33 have integral connecting terminals 34 on the inner upper margins of the walls 30. In addition, the outer web portions of the legs 33 are integral at their upper ends not only with the top wall 29 but also with respective vertical transverse reinforcing web flanges 35 integrally joining the side walls 30. Below the handle the center longitudinal divider 18 is upwardly open by a suitable gap in the top wall 29, primarily for molding die clearance. By having the handle narrower from the base of the legs 33 upwardly than the spacing afforded between the divider side walls 30 as well as shorter than the space between the webs 35, and the height of the handle no greater above the top wall 29 than the height of the side walls 30, reception of the handle within the hollow space in the divider rib partition 18 during stacking of containers is enabled. Further, by having the longitudinal and transverse distance between the outside base junctures of the legs 33 dimensioned to fit generally nestingly with ample clearance within the lower edge surfaces of the side walls 30 and the reinforcing webs 35, assistance in stacking registration of the carriers is afforded additional to the registration provided by the bosses 27.

Cooperative with the wide longitudinal center divider 18 in compensating for the the substantially thinner longitudinal divider and side wall thickness or section as compared with an interchangeably useable wooden carrier, are inset wall panels 37 (FIGS. 1 and 5) in the side walls 11 from about the transverse center of the endmost cells 17 of the row of such cells along each side wall. In addition to their function in reducing the corresponding width between the side walls, the inset panels 37 afford on their outer faces inset protective areas in the side walls in which identification and advertising labels and the like may be applied. Along their upper edges, the panels 37 are reinforced by respective buffer ribs 38 joining the contiguous upper edge portions of the end areas of the side walls beyond the ends of the inset panels.

Between the transverse end partitions 20 and the respective end walls 12 at each end of the carrier is provided a spacer buffer-handle construction extending across the width of the carrier and of a depth utilizing space available due to the greatly reduced wall section thickness afforded by the molded plastic construction, as compared with a comparable wooden carrier, although maintaining the outside length dimension of the plastic carrier substantially the same as the wooden carrier. Buffer reinforcement of the front wall 12 is afforded by respective integral end extensions of the longitudinal partitions 19. Additionally, between such end extensions and the corners 15 vertical respective connecting web flanges 39 are provided integrally connecting the front wall 12 with the end partitions 20 and the base wall 10. Conveniently the pockets thus formed in the end spacer-buffer area open upwardly as handle structure and afford easy access for the fingers of manipulating hand in conveniently carrying empty carriers or pulling filled carriers. Drainage of the pockets flanking the end extensions of the partitions 19 is through the holes 23, while drainage holes 40 are provided in the base wall areas of the corner pockets.

In addition, each of the end wall spacer-buffer structures is provided with a respective central end handle bar structure 41 within the same plane of the end wall 12. A desirable rugged construction of the handle bar 41 comprises a generally upwardly opening U-shape cross-section bridging across a central vertical inset 42 in the associated end wall 12, with its upper edge in this instance coplanar with the top edge of the end wall and its outer face flush with the end wall (FIGS. 1, 2 and 6). In length, the handle bar 41 is sufficient to enable convenient grasping engagement thereunder of the four-phalange fingers of the hand, with the thumb over-gripping the handle. By having the handle bar 41 of spaced double wall width and its lower edge of downwardly facing and rounded cross-sectional formation, stiffness is imparted and underhand gripping facilitated.

To provide ample gripping access clearance or finger-accommodating space inwardly adjacent to the handle bar 41, the inset 42 extends to the adjacent end partition 20, and such partition is downwardly recessed in alignment with the inset 42 whereby to afford a finger clearance opening 43 having the lower edges defining the same substantially lower than the lower edge of the handle bar as best seen in FIGURE 2. Such gripping clearance is further enhanced or amplified by having the adjacent end of the double wall central longitudinal divider 18 spaced inwardly relative to the inner side of the handle bar 41. For reinforcement, the adjacent spaced end of the hollow divider is provided with a transverse integral end wall or web 44 integrally joining the bottom wall 10 and conveniently spaced from the adjacent end partition 20 about the same distance as the partition 20 is spaced from the adjacent carrier end wall 12.

Reinforcement for the handle 41 as well as the adjacent end structure of the carrier is afforded by a central longitudinal fin web 45 affording, in effect, a longitudinally central vertical outward extension of the center divider 18, being integral with the divider end wall 44, the bottom wall 10, the partition 20 and the inner side of the handle 41. This web 45 is as thin as practicable to be received between the middle and ring fingers of a handle-grasping hand without crowding. It is thus provided as a single thickness extension of the center divider 18, that is its thickness is substantially the same as that of the single thickness divider partitions. On its upper edge, the web 45 desirably extends in a common plane with the top wall 29 and the upper edge of the handle 41. Adjacent the lower edge of the handle 41, the web 45 is provided with an edge 47 which faces downwardly within the inset 42 and curves inwardly and downwardly to a vertical edge 48 flush with the outer face of the partition 20.

Additional reinforcement for the handle 41 is afforded by an integral web 48 connecting the two walls of the handle bar 41 and aligned with, and serving substantially as an extension of the reinforcing and connecting web 45. Further reinforcement for the handle bar 41 is provided by auxiliary integral reinforcement webs 49 equally spaced beyond each side of the central reinforcing web 48. Besides such reinforcement, reinforcement is afforded by vertical, longitudinal plane integral side walls or webs 50 at respectively the opposite sides of the inset 42 and to which the opposite ends of the handle bar 41 are integrally joined and which reinforcingly connect the end wall 12 with the end partition 20 at each side of the opening 43. Drainage holes 51 are provided in the upwardly opening pockets defined between the several reinforcing webs intersecting the hollow handle 41.

A substantial aggregate area of the underface of the base wall 10 lies in a common supporting plane to afford frictional surface to minimize undesirable slippage on a supporting surface. However, to maintain the base wall 10 of minimum practical molded section but with such reinforcement as to afford adequate bottle-supporting strength without sagging, and to afford an elevation of the supported bottles in the cells 17 on the upper surfaces of the base wall substantially equal to the thickness of bottom boards of wooden carriers, an advantageous pattern of reinforcing and elevating ribs and areas is provided on the base wall. To this end, a pattern of limited length aligned, spaced longitudinal elevating ribs 52 are provided in respective series along longitudinal center lines through the longitudinal rows of cells 17. Similar short raised transversely extending elevating ribs are disposed in respective series on lines along the transverse centers of the aligned cells 17. At the respective opposite ends of the cell rows, the ribs 52 merge reinforcingly with the end partitions 20. In respect to the transverse partitions 21, the ribs 52 integrally merge with and extend reinforcingly across the lower portions of these partitions. At each of the ribs 52, the partitions 21 have vertical respective reinforcing posts 54 extending integrally upwardly from the ribs 52 and providing on each side of the partition a respective bottle spacer rib.

Along the side walls 11, the reinforcing and spacer ribs 53 merge therewith at their outer ends and into the respective longitudinal juncture ribs 13, with integral closure flanges 55 respectively extending over the outer ends of the downwardly opening channels or grooves defined by the associated ribs. Along the longitudinal partitions 19, the ribs 53 intersect the lower portions of the partitions integrally. Along the central hollow divider 18, the ribs 53 merge integrally into the divider side walls 30.

Each of the elevating and reinforcing ribs 52 and 53 provides a respective top land surface in a common plane and with the side walls defining the ribs tapering away from such lands toward juncture with the base wall 10 in strut-like reinforcing relation. Within each of the cells 17, the ends of the ribs 52 and 53 are in symmetrically spaced relation on a diameter smaller than the diameter of bottles to be supported in the cells whereby to afford equidistant four-place support for the bottom of the bottle.

Additional support against sagging of the central portion of the bottom wall 10 within each of the cells 17 is afforded by a generally circular shallow flat boss-like upward offset area 57 of somewhat larger diameter than the diameter described about the adjacent ends of the ribs 52 and 53 but shallower than such ribs. About their perimeter, each of the central offsets 57 has a tapered flange side reinforcing-like juncture 58 with the bottom wall 10 and integrally joining the side flaring strut juncture flanges of the reinforcing ribs. On their undersides, the offsets 57 afford downwardly opening shallow respective recesses 59 generally nestably receptive of the cap crowns of bottles, as shown in dash outline at the bottom of FIGURE 5, in a subjacent carrier to enable stacking of a plurality of loaded carriers for storage or even sales display if desired with freedom from accidental sliding displacement of the stacked carriers either longitudinally or laterally from the stack.

As shown in dash line on the upper portion of FIGURE 5, by having the handle 31 of less height than the tops of the bottles even imperforate bottom containers or wooden carriers can be stacked on the bottles in the carrier of this invention.

The ribs 52 and 53 together with the shallower but integral reinforcing strut flanges 58 substantially and adequately stiffen the cell bottom wall areas to sustain dead load weights thrusting downwardly from bottle load contents of the cells as well as the superimposed loads of stacked carriers as well as upward thrusts of bottles on which stacked. Such reinforcing rib and flange formations also provide some protective cushioning or shock absorption for the bottle load due to the inherent resilience of the plastic material.

Drainage from the pocket-like depressions on the bottom wall 10 in the cells 17 alongside the central longitudinal divider 18 and its end extensions 45 is afforded by respective drain holes 60.

From the foregoing it will be apparent that the present invention provides a twenty-four bottle carrier of generally thin section molded plastic unitary one-piece shell structure which because of its novel structural features is fully interchangeably, haphazardly mixed and randomly usable with conventional wooden carriers of the same capacity, so that this molded plastic carrier can be serviced by the same bottling plant equipment employed in servicing the wooden carriers. Further, the present molded plastic carrier is fully adapted for interchangeable, haphazardly mixed and random use with wooden carriers in the transportation equipment such as racked trucks and the like in which wooden carriers are handled, and in loaded storage and display stacking, and the like.

One-handed carrying of the carrier is greatly facilitated by the central carrying handle 31, in addition to the handle structures across the entire ends of the carrier. These end handle structures afford improved handling capability and are made possible by the additional available space inwardly from the end walls in contrast to conventional wooden cases or carriers.

Since all included angles of the present molded carrier structure are beveled or rounded not only is a highly damage resistant structure afforded but cleaning, as by washing, of the inner surfaces of the carrier is greatly facilitated. Elimination of sharp outside angles on the bottom wall and adjacent portions of the side and end walls enables the carrier to be slid over rough surfaces with great facility and avoids damage to contacted surfaces as by gouging.

It will be understood that modifications and variations may be effected without departing from the scope of the novel concepts of the present invention.

I claim as my invention:

1. A molded plastic carrier for bottles comprising:
   (a) a generally rectangular tray-like structure having a bottom wall and upstanding integral side and end walls;
   (b) longitudinal and transverse upwardly and crossingly related dividers integral with said bottom wall and respectively the end and side walls and compartmenting the tray area into upwardly opening bottle-receiving cells, said walls and dividers being of substantially similar thin panel or web section, the height of said side and end walls as well as the carrier perimeter defined by such walls being substantially equivalent to the walls of a conventional wooden carrier of the same size and capacity;
   (c) and means on said base wall and between said end and side walls, including a hollow longitudinal divider rib of substantial width having a central upwardly extending carrying handle comprising a handlebar and legs spaced substantially inwardly from the ends of said divider rib and supporting said handlebar at a substantial elevation above said divider rib and integral therewith, said rib functioning to compensate for the thickness of wooden boards and slats in the corresponding parts of a wooden carrier so that bottles supported in said cells will be oriented similarly as in such a wooden carrier and said handlebar being at a height sufficiently less than the height of bottles to be carried by the carrier to enable resting of the bottom of a flat bottomed carrier on the tops of the bottles whereby the molded plastic carrier is interchangeably usable with the wooden carrier.

2. A 24-bottle molded plastic carrier comprising:
   (a) a base wall and integral upstanding side and end walls defining a tray-like structure of length and width and height dimension substantially the same as of a conventional wooden container of the same capacity;
   (b) integral longitudinal and transverse divider partitions rising from said base wall and dividing the tray area within said side and end walls into four parallel rows of six bottle-receiving upwardly opening cells, said longitudinal partitions integrally joining said end walls, said transverse partitions integrally joining said longitudinal partitions and at their ends joining said side walls, the transverse partitions nearest the respective end walls being spaced inwardly from said end walls a distance substantially less than the dimensions across the cells and affording between said end walls and such nearest transverse partitions respective hollow buffer areas and compensating for end board thickness of a conventional wooden carrier;
   (c) handle structure integral with each of said end walls within the planes of said end walls and spaced from the adjacent transverse partitions;
   (d) and one of said longitudinal partitions being joined at its ends to said handle structures across the spaces between said transverse partitions and said handle structures.

3. A one-piece molded plastic carrier for bottles comprising:
   (a) a generally tray-like structure including a base wall and upstanding side and ends walls on the respective edges of said base wall;
   (b) means subdividing the area within said side and end walls into a plurality of upwardly opening compartments and including respective partitions spaced from said end walls a distance less than the dimensions across the compartments, said partitions integrally joining the side walls and said base wall;
   (c) and a plurality of longitudinally extending integral reinforcing webs connecting said end walls and said partitions and said base wall and providing a reinforced upwardly opening hollow end buffer at each end of the carrier.

4. A one-piece molded plastic carrier for bottles comprising:
   (a) a generally tray-like structure including a base and upstanding side and end walls;
   (b) means subdividing the area within said side and end walls into a plurality of upwardly opening compartments and including respective partitions spaced from said end walls a distance less than the dimensions across the compartments, said partitions integrally joining the side walls and said bottom wall;
   (c) and a plurality of longitudinally extending integral reinforcing webs connecting said end walls and said partitions and said base wall and providing a reinforced hollow end buffer at each end of the carrier, said webs defining therebetween upwardly opening pockets adapted to receive fingers of a hand for manipulating the carrier.

5. A one-piece molded shell plastic carrier for bottles comprising:
   (a) a bottom wall with upwardly rising end and side walls defining a supporting tray area;
   (b) a longitudinally centrally extending divider partition rising integrally from said bottom wall;
   (c) transverse partitions in adjacently spaced relation to said end walls and integral with the bottom wall and said side walls, said end walls having central inset areas with a respective integral handle bar integrally bridging across the top of each of said areas and spaced outwardly relative to the adjacent transverse partition, each of said transverse partitions having a finger clearance recess aligned with the handle;
   (d) and respective integral reinforcing extensions from said longitudinal partition integral with the adjacent transverse partition and the adjacent handle bar.

6. A unitary molded shell plastic carrier for bottles comprising:
   (a) a bottom wall having side walls and end walls rising from its perimeter;
   (b) integral partition means dividing the area between said side and end walls into upwardly opening bottle-receiving compartments and including a longitudinal hollow double wall divider partition having its opposite ends closed adjacent to the respective end walls;

(c) a handle bar of double wall hollow construction integral on each of the end walls in alignment with said longitudinal double wall partition, said end walls being recessed adjacent to the handles for manipulating finger clearance;

(d) and each end of said double wall partition having a thin web extension integrally connected to the adjacent handle bar and corresponding to about the thickness of one wall of the partition.

7. A unitary molded shell plastic carrier for bottles comprising:

(a) a bottom wall having side walls and end walls rising from its perimeter;

(b) integral partition means dividing the area between said side and end walls into upwardly opening bottle-receiving compartments and including a longitudinal hollow double wall divider partition having its opposite ends closed adjacent to the respective end walls;

(c) a handle bar of double wall hollow construction integral on the upper portion of each of the end walls in alignment with said longitudinal double wall partition, said end walls being recessed below the handles for manipulating finger clearance;

(d) each end of said double wall partition having a thin web extension integrally connected to the adjacent handle bar and corresponding to about the thickness of one wall of the partition;

(e) and a plurality of spaced connecting webs extending integrally between the walls of said handle bars.

8. In a molded shell plastic bottle-carrier of the character described;

(a) bottom, side and end walls defining a carrier tray;

(b) partitions dividing the tray into a plurality of bottle-receiving compartments and comprising respective transverse partitions adjacently spaced from the respective end walls a distance substantially less than the dimensions across the compartments, each of the end walls having a central recessed portion defined at each side by a connecting web integral with the adjacent transverse partition;

(c) and a hollow double wall handle bar extending integrally across the recess and joined to said webs with its inner wall spaced from the adjacent transverse partition.

9. In a molded shell plastic bottle-carrier of the character described;

(a) bottom, side and end walls defining a carrier tray;

(b) partitions dividing the tray into a plurality of bottle-receiving compartments and comprising respective transverse partitions adjacently spaced from the respective end walls a distance substantially less than the dimensions across the compartments, each of the end walls having a central recessed portion defined at each side by a connecting web integral with the adjacent transverse partition;

(c) a respective hollow double wall handle bar extending integrally across each of said recessed portions and joined to said webs spaced from the adjacent transverse partitions;

(d) and a reinforcing web centrally joining each of the handlebars to the adjacent transverse partition.

10. A one-piece molded plastic bottle-carrying tray carrier of the character described comprising:

(a) a base wall having upstanding walls on its perimeter;

(b) crossingly related integral partitions dividing the tray into a plurality of bottle-receiving compartments, one of said partitions extending centrally on said bottom wall and being of double wall hollow construction opening downwardly through said bottom wall and having integral side walls and a top wall with an opening along a central portion of the top wall;

(c) and a handle of generally inverted U-shape form in elevation comprising a horizontal handle bar of upwarding opening generally U-shape channel cross-section and downwardly extending legs on the ends of the handle bar of downwardly opening generally U-shape channel cross-section having base ends thereof integrally connected to said side walls and said top wall.

11. A one-piece molded plastic bottle-carrying tray carrier of the character described comprising;

(a) a base wall having upstanding walls on its perimeter;

(b) crossingly related integral partitions dividing the tray into a plurality of bottle-receiving compartments, one of said partitions extending centrally on said bottom wall and being of double wall hollow construction opening downwardly through said bottom wall and having integral side walls and a top wall with an opening along a central portion of the top wall;

(c) a handle of generally inverter U-shape form in elevation comprising a horizontal handle bar of upwardly opening generally U-shape channel cross-section and downwardly extending legs on the ends of the handle bar of downwardly opening generally U-shape channel cross-section having base ends thereof integrally connected to said side walls and said top wall;

(d) and reinforcing webs within said hollow partition respectively joining said side walls and the base ends of said handle legs.

12. In a one-piece molded plastic bottle-carrier;

(a) a base wall having upstanding walls on its edges and crossingly related integral partitions connected to and extending between said upstanding walls and dividing the area within said upstanding walls into a plurality of bottle-receiving cell compartments;

(b) downwardly opening upwardly projecting hollow elongated reinforcing and bottle-supporting ribs molded in said bottom wall and integrally connected to said partitions;

(c) and shallow downwardly hollow upward offsets on said bottom wall between and connected to said ribs and affording bottle cap receiving recesses when the carrier is stacked on a subjacent loaded carrier.

13. In a one-piece molded plastic bottle-carrier;

(a) a base wall having upstanding walls on its perimeter and crossingly related integral partitions connected to and extending between said upstanding walls and dividing the area within said upstanding walls into a plurality of bottle-receiving cell compartments;

(b) downwardly opening upwardly projecting hollow elongated reinforcing and bottle-supporting ribs molded in said bottom wall and integrally connected to and extending through said partitions;

(c) and vertical reinforcing post formations integral with certain of said partitions and reinforcingly connected to and in alignment with certain of said ribs and affording bottle spacer ribs on said certain partitions.

14. In a one-piece molded shell plastic bottle-carrier;

(a) a base wall having side and end walls rising therefrom and joined on curved junctures to one another and to the base wall;

(b) a plurality of spaced longitudinal partitions and a plurality of spaced transverse partitions integrally crossingly related and joined at their ends respectively to the end walls and the side walls, said partitions dividing the area between said end and side walls into a plurality of bottle-receiving upwardly opening cells;

(c) and downwardly opening hollow elongated reinforcing and spacer ribs formed in said base wall and including respective longitudinal series of such ribs extending through and integral with the respective transverse partitions centrally aligned with and extending to a limited length into each of the adjacent cells and a plurality of transversely aligned series of similar hollow ribs traversing the longitudinal partitions integrally, with certain of the transversely aligned ribs running integrally at ends thereof into the respective side walls and having closure flanges integral with the side walls substantially closing such ends.

15. A molded plastic bottle-carrier comprising:
   (a) a bottom wall having peripheral upstanding side and end walls defining a carrying tray;
   (b) a divider partition on said bottom wall and between and connected to certain of said upstanding walls;
   (c) a handle structure centrally over said bottom wall integral with said partition, said handle structure defining a downwardly free hand hole and said bottom wall having an opening therethrough communicating freely with said hand hole;
   (d) and all surfaces of all parts of the carrier including all of said walls and said handle structure and the partition facing either upwardly or downwardly or toward the ends or sides, and thereby enabling one-shot molding of the entire carrier in one piece between two opposed dies movable toward and away from one another and free from any transverse slides.

16. A molded plastic bottle-carrier as defined in claim 15, in which said handle structure comprises a handlebar of upwardly opening U-shape transverse vertical cross section with a rounded underside.

17. A molded plastic bottle-carrier as defined in claim 15, in which said handle structure is of substantially inverted U-shape comprising a handlebar and upwardly extending legs at the ends of said bar integral with said partition, said bar being of substantially smaller vertical transverse cross section than the sections from side-to-side of the lower ends of said legs, said legs tapering from their lower ends upwardly to the respective opposite ends of the smaller cross section handlebar.

References Cited

UNITED STATES PATENTS

| D. 195,101 | 1963 | Fogerty | D58—5 |
| 2,414,171 | 1/1947 | Scharff | 220—21 |
| 2,535,493 | 12/1950 | Gerber | 220—97 |
| 2,826,332 | 3/1958 | Hudson | 220—95 |
| 2,974,819 | 3/1961 | Melville | 220—20 |
| 3,172,538 | 3/1965 | Fowler | 211—49 |
| 3,281,010 | 10/1966 | Moore et al. | 220—102 |
| 3,283,947 | 11/1966 | Cornelius | 220—102 |
| 3,297,196 | 1/1967 | Cornelius | 220—102 |
| 3,151,762 | 10/1964 | Vidal | 220—21 |

FOREIGN PATENTS 686,780  5/1964  Canada.

OTHER REFERENCES

"Modern Plastics" magazine, issue of August 1963, pp. 78–83, article entitled "Here Come the Beverage Cases."

DAVIS T. MOORHEAD, *Primary Examiner.*

GEORGE O. RALSTON, JOSEPH R. LECLAIR,
*Examiners.*